US005687366A

United States Patent [19]

Harvey, III et al.

[11] Patent Number: 5,687,366

[45] Date of Patent: Nov. 11, 1997

[54] CROSSING LOCALE BOUNDARIES TO PROVIDE SERVICES

[75] Inventors: John Harvey, III, Wilmington, Del.; Andrew Michael Daniels, Menlo Park; William James Saunders, Mountain View, both of Calif.

[73] Assignee: Apple Computer, Inc., Cupertino, Calif.

[21] Appl. No.: 435,372

[22] Filed: May 5, 1995

[51] Int. Cl.$^6$ .......... G06F 17/30

[52] U.S. Cl. .......... 395/610; 395/609

[58] Field of Search .......... 395/650, 823, 395/200.03, 200, 200.09, 610, 607; 364/200

[56] References Cited

U.S. PATENT DOCUMENTS

| | | | |
|---|---|---|---|
| 4,887,204 | 12/1989 | Johnson et al. | 364/200 |
| 4,949,248 | 8/1990 | Caro | 364/200 |
| 5,005,122 | 4/1991 | Griffin et al. | 364/200 |
| 5,014,192 | 5/1991 | Mansfield et al. | 364/200 |
| 5,321,816 | 6/1994 | Rogan | 395/200 |
| 5,335,346 | 8/1994 | Fabbio | 395/600 |
| 5,339,419 | 8/1994 | Chan | 395/700 |
| 5,355,477 | 10/1994 | Strickland et al. | 395/600 |
| 5,393,713 | 2/1995 | Schwob | 455/158.5 |
| 5,440,482 | 8/1995 | Davis | 364/419.13 |
| 5,442,771 | 8/1995 | Filepp | 395/650 |
| 5,446,842 | 8/1995 | Schaeffer | 395/200 |
| 5,446,896 | 8/1995 | Hegarty et al. | 395/650 |
| 5,459,865 | 10/1995 | Heninger | 395/650 |
| 5,475,819 | 12/1995 | Miller et al. | 395/200.03 |
| 5,485,373 | 1/1996 | Davis | 364/419.13 |
| 5,519,858 | 5/1996 | Walton et al. | 395/600 |
| 5,544,320 | 8/1996 | Konrad | 395/200.09 |
| 5,548,779 | 8/1996 | Andert et al. | 395/823 |

OTHER PUBLICATIONS

"*An Introduction to Operating Systems*" Harvey M. Deitel, 1990, Addison–Wesley Publishing Company.

*Inside Macintosh,* Addison–Wesley Publishing Company, 1993. pp. i–xxx, B–1–B–86.

*Guide to Macintosh Software Localization,* Addison–Wesley Publishing Company, 1992. pp. iv–xiv, 19–32, 55–84.

*Working Draft: Distributed Internationalisation Services,* X/Open Company, Ltd., UK, 1993. pp. i–xvi, 1–40.

O'Donnell, S. M. *Programming for the World: A Guide to Internalization.* PTR Prentice Hall, Prentice–Hall, Inc. 1994. pp. i–xi, 125–154.

*Primary Examiner*—Thomas G. Black
*Assistant Examiner*—Frantz Coby
*Attorney, Agent, or Firm*—Blakely, Sokoloff, Taylor & Zafman

[57] ABSTRACT

A method and apparatus in a computer system for providing localized services on a computer system. Responsive to a request from a first process requesting a first international function, a database is scanned for a first service which provides the first international function. The database is arranged by locale. If the first service does exist in a first locale in the database, then a second locale in the database is scaned for the first service. If the second locale contains the first service then the first service is retrieved and made available to the first process. Thus, services for first process may span locale boundaries in the database wherein the first process references at least two services which reside in at least two of the locales. The functions include sorting service functions, formatting service functions.

25 Claims, 16 Drawing Sheets

LocaleIteratorCreate
1005

LocaleIterate 1007

CROSSING LOCALE BOUNDARIES TO PROVIDE SERVICES

BACKGROUND OF THE INVENTION

1. Field of the Invention

The present invention relates to providing international services in computer systems. More specifically, the present invention relates to providing international services in a computer system, such as those used for formatting, input and other services, wherein the services cross locale boundaries.

2. Background Information

As computer systems proliferate to beyond regional and national boundaries, demands for international software increase. To make software more international, services are made available which provide functionality within the system and application programs which allow the input and presentation of data which is nationally, and even, culturally-specific. For example, services are provided which allow the input of text in a way which is understood by native speakers. Services may also include those which allow the formatting of dates, monetary sums, provide sort ordering rules, and specify whether text is displayed using the roman or Cyrillic character set. These services may also include the encoding of the language, and whether text in the language is displayed left-to-right, right-to-left, up-to-down, or any combinations of these. Other services may also be provided, according to implementation.

One of the ways in which international capabilities has been provided is through the use of locales. Locales are provided for a number of nationalities, and/or, cultures. Locales typically specify many of the above-services, including text services, sorting services, formatting services, spell-checkers, and other services which require culturally-specific facilities. Typically, a large number of these services are provided under a locale label, and provide the services as a single monolithic group of services which is difficult to modify or "localize" to a particular region, culture, and/or individual or group of individuals.

One shortcoming in certain systems implementing locales, or other international functionality, is that they frequently suffer from a very small naming space in relation to the number and variety of services which may be required by future application programs, including, those requiring international, regional, or other localized services. On the Macintosh brand computer system, for example, Script Manager, International utilities Package, WorldScript I, WorldScript II, the Language Manager, and the Text Services Manager work together to provide international functionality. The first four organize data based on Script ID. On the Macintosh a Script represents a writing system. Scripts also indirectly define a character encoding. Script specific data is named by assigning ranges of possible resource IDs to each script. Thus to determine which script a certain data type works with, the data type's resource ID is retrieved and the script ID can be calculated back from the resource ID. This system does not provide an explicit way to categorize data by language, encoding, region, or other attributes which an application program may require. An application or system service that wants to do this must develop some method of its own. This limited name space results in data that is not really writing system specific being forced into a categorization by script code.

Thus, due to the proliferation of computer systems, especially across national and regional boundaries, new methods which explicitly categorize services by language, encoding, region, etc. . . . , are required which address many of the shortcomings of the prior art. This service should provide an ample naming space for any additional functionality to be provided, and provide means for accessing those services irrespective of a locale, but rather, based upon some other criteria.

SUMMARY

A method and apparatus in a computer system for providing localized services on a computer system. Responsive to a request from a first process requesting a first international function, a database is scanned for a first service which provides the first international function. The database is arranged by locale. If the first service does not exist in a first locale in the database, then a second locale in the database is scaned for the first service. If the second locale contains the first service then the first service is retrieved and made available to the first process. Thus, services for first process may span locale boundaries in the database wherein the first process references at least two services which reside in at least two of the locales. The functions include sorting service functions, formatting service functions.

BRIEF DESCRIPTION OF THE DRAWINGS

The present invention is illustrated by way of example and not limitation in the figures of the accompanying in which like references indicate similar elements and in which.

DETAILED DESCRIPTION

The present invention relates to providing international services in a computer system, such as those used for inputting and presenting text to a user in a computer system. Embodiments of this invention have many applications, however, it may be particularly useful for providing different services in a computer system irrespective of locale. These allow the retrieval of services based on characteristics or attributes of the objects which are most important to requesting processes. Although the present invention will be described with reference to certain specific embodiments thereof, especially, with relation to certain hardware configurations, data structures, packets, method steps, and other specific details, these should not be viewed as limiting the present invention. Various modifications and other changes may be made by one skilled in the art, without departing from the overall spirit and scope of the present invention.

A portion of the disclosure of this patent document contains material which is subject to copyright protection. They copyright owner has no objection to the facsimile reproduction by anyone of the patent disclosure, as it appears in the Patent and Trademark Office patent files or records, but otherwise reserves all copyright rights whatsoever. Copyright© Apple Computer, Inc.

Figure 1:
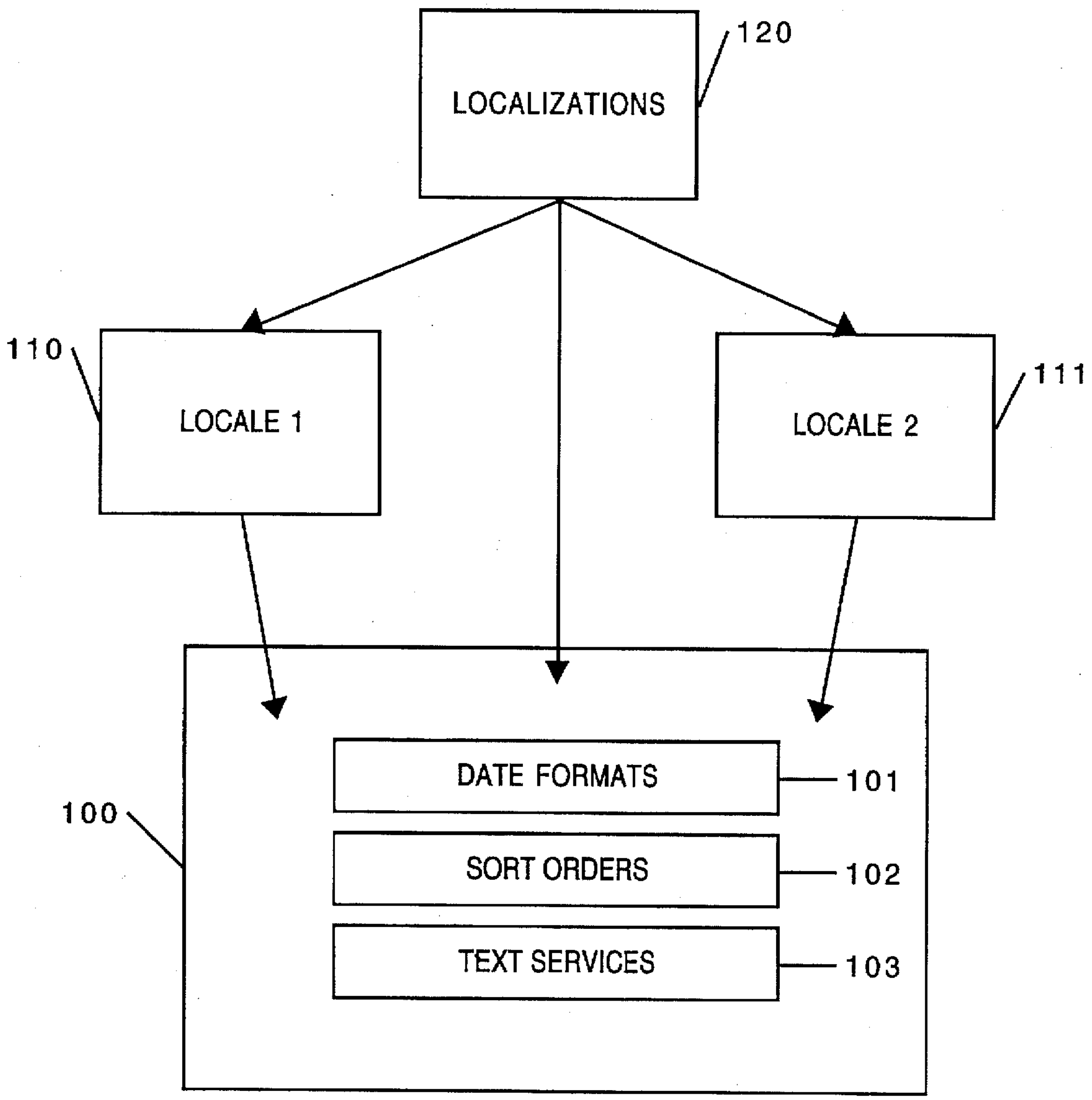
FIG. 1 shows how Locale Files, Text Services, and Localization files map to Locale objects in a Locale Object database in embodiments of the present invention.

Referring to FIG. 1, implemented embodiments of the present invention de-couple the relationships between locales and services provided for specific locales. The resource type and resource ID limitations which existed in the prior art Macintosh brand environment, and its associated limited name space, have been addressed by implemented embodiments of the present invention. In this paradigm, objects such as 101, 102, and 103, provide a variety of services, including, but not limited to, date formatting services, sorting order services, and other text services, such as input methods and tokenizations. Thus, an input method which may have typically been associated with a particular Locale, and by extension, the script in which that locale is defined, may be used irrespective of identifiers such as resource type and resource ID values within a specific range for the script.

A new process resident in computer system memory, known as the Locale object Manager, and which is executed by the computer system's processor, as will be described below, provides such cross-Locale services to provide different functionality. Thus, instead of associating services or objects such as 101–103 with particular Locales such as 110–111, any Locale may reference any service available to the Locale object manager. In addition, localizations 120 may be defined, which may reference Locales 110 and 111 and Locale objects, such as 101–103, in order to localize the computer system in which the Locale object Manager is active.

Because characteristics of the services are stored, and the characteristics can be any characteristic of a service, irrespective of language or locale, the system is much more flexible than certain prior art systems. Rather than a finite number of different locales and certain specific services within those locales, configuration of a system can be made much more specific than those using prior art locales and localizations, even allowing the configuration of the system according to a particular user's requirements. This is because the services are stored with associated attributes which define the services.

Figure 2A:
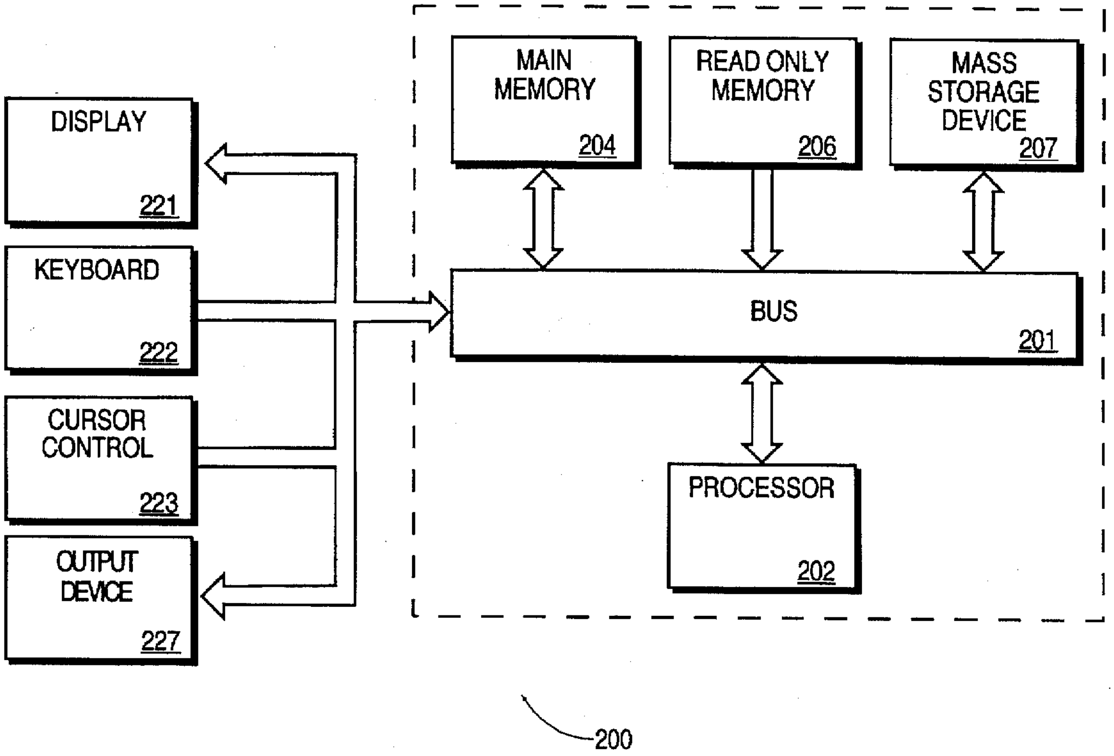
FIGS. 2a and 2b show an example system in which an embodiment of the present invention may be implemented, including, the interaction between locales, localizations, the locale object manager, the locale database and application programs.

A typical system configuration in which embodiments of the present invention may be implemented is shown in FIG. 2*a*. In various embodiments of the present invention, a general purpose computer system is used for implementing the processes, objects and associated services to be described here. A computer system, such as a workstation, personal computer or other processing apparatus 200 is illustrated in more detail in FIG. 2*a*. System 200 comprises a bus or other communication means 201 for communicating information, and a processor 202 coupled with bus 201 for processing information. System 200 further comprises a random access memory (RAM) or other volatile storage device 204 (referred to as main memory), coupled to bus 201 for storing information and instructions to be executed by processor 202. Main memory 204 also may be used for storing temporary variables or other intermediate information during execution of instructions by processor 202. Included in memory 204 during run-time may be the conference component module which operates according to the communication protocols to be described below. System 200 also comprises a read only memory (ROM) and/or other static storage device 206 coupled to bus 201 for storing static information and instructions for processor 202, and a data storage device 207 such as a magnetic disk or optical disk and its corresponding disk drive. Data storage device 207 is coupled to bus 201 for storing information and instructions.

System 200 may further include a display device adapter 221 such as a cathode ray tube (CRT) or liquid crystal display (LCD) coupled to bus 201 for displaying information to a computer user. Such a display 221 may further be coupled to bus 201 for the receipt of video or image information. An alphanumeric input device 222, including alphanumeric and other keys may also be coupled to bus 201 for communicating information and command selections to processor 202. An additional user input device is cursor control 223, such as a mouse, a trackball, stylus, or cursor direction keys, coupled to bus 201 for communicating direction information and command selections to processor 202, and for controlling cursor movement on display 221. A hard copy output device 227 can also be coupled to bus 301 for generating hard copy information, including international data such as multi-locale information using multiple objects. Embodiments of the present invention may be especially useful for inputting international information to application programs from input devices 222 and 223, and output of information on devices 221 and 227 in a culturally-specific, or even, user-specific manner. More specific services can be located and used using embodiments of the present embodiments of the present invention, rather than certain prior art systems which were limited by the pre-designated locales and localizations.

Note, also, that any or all of the components of system 200 and associated hardware may be used in various embodiments, however, it can be appreciated that any configuration of the system may be used for various purposes according to the particular implementation.

In one embodiment, system 200 is one of the Apple Computer® brand family of personal computers such as the Macintosh 8100 brand personal computer manufactured by Apple Computer, Inc. of Cupertino, Calif. Processor 202 may be one of the PowerPC brand microprocessors manufactured by Motorola, Inc. of Schaumburg, Ill.

Note that the following discussion of various embodiments discussed herein will refer specifically to a series of routines which are generated in a high-level programming language (e.g., the C or C++ programming language) and compiled, linked, and then run as object code in system 200 during run-time within main memory 204 by processor 202. For example the object code may be generated by the C++ Compiler available from Symantec, Inc. of Cupertino, Calif.

Although a general purpose computer system has been described, it can be appreciated by one skilled in the art, however, that the following methods and apparatus may be implemented in special purpose hardware devices, such as discrete logic devices, large scale integrated circuits (LSI's), application-specific integrated circuits (ASIC's), or other specialized hardware. The description here has equal application to apparatus having similar function.

Figure 2B:
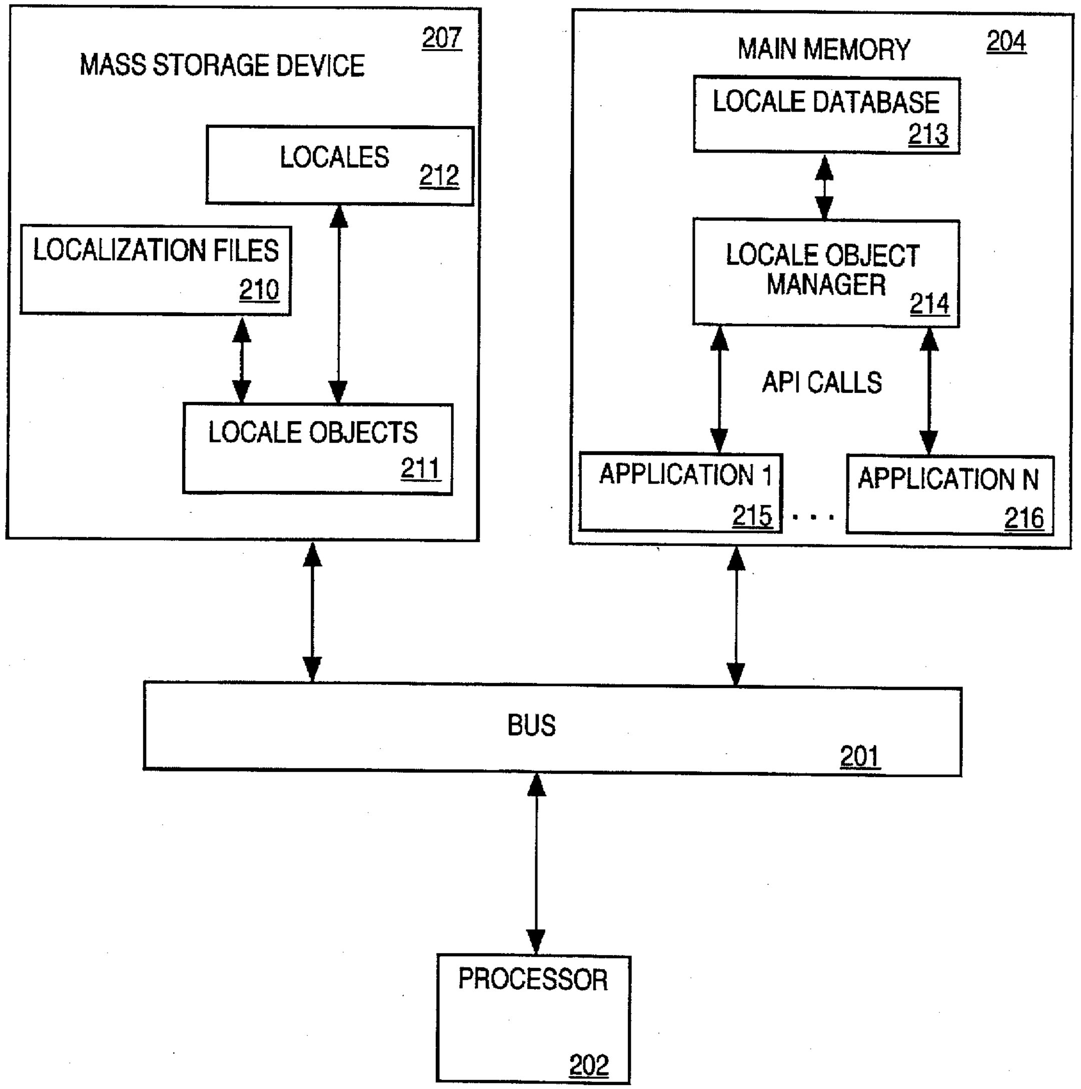

FIG. 2*b* shows a more detailed view of the files resident in the mass storage device 207 and main memory 204. Locale information 212 is loaded from mass storage device 207 by Locale object Manager 214 across bus 201 by processor 202, and is used to reference locale objects 211. Locale information 212 and Locale objects 211 are used to build the Locale object database 213 in main memory 204 of the computer system during system boot-time. Localization files 210 may also be read and used to modify the locale database according to any defined localizations. These may reference both Locales defined by Locale information 212 and Locale objects 211. The Locale database 213 may be file-mapped or may be structured to allow rapid searching by name and by attribute(s).

Figure 3:
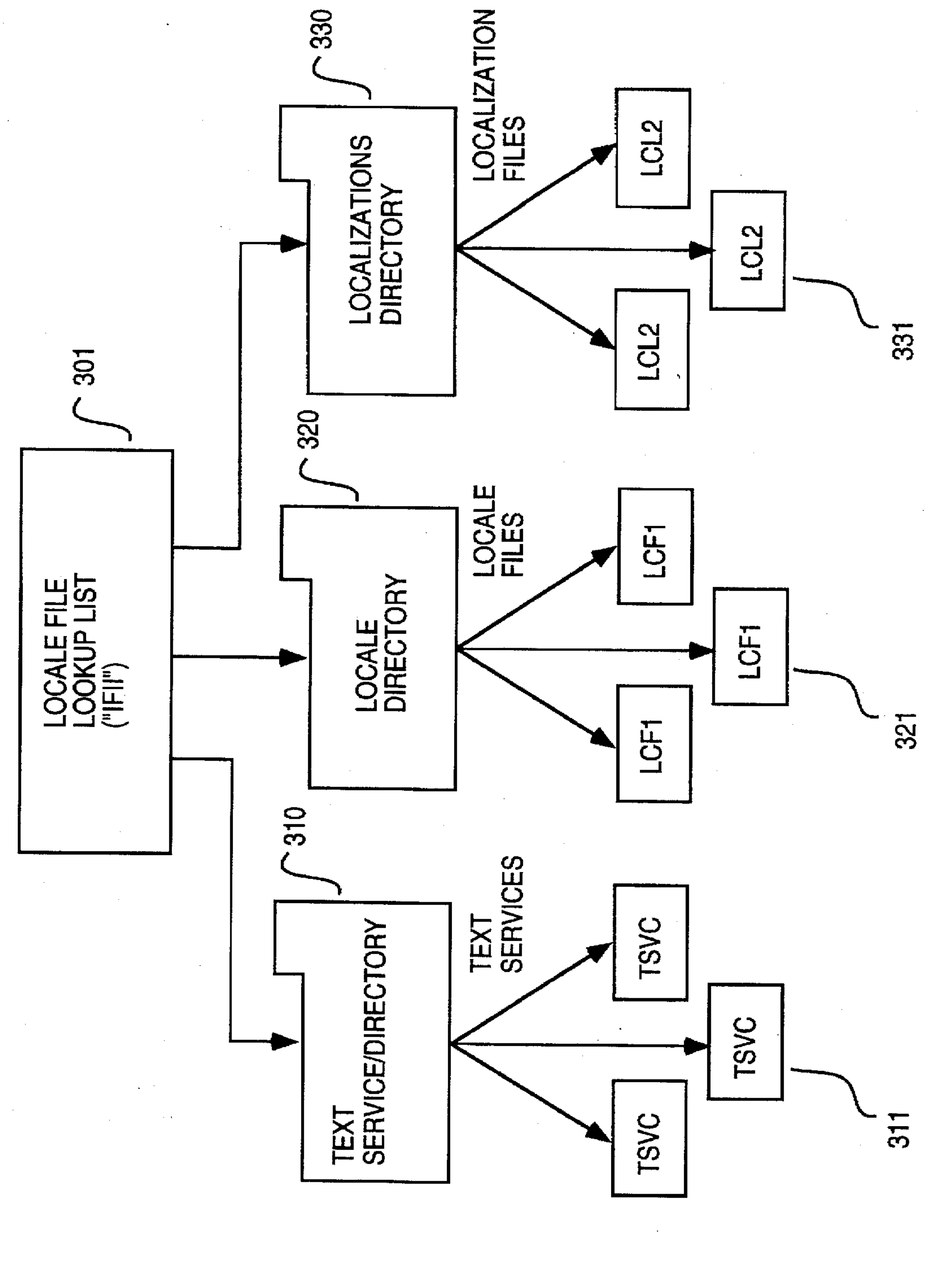
FIG. 3 shows the organization of a locale lookup list, text services, locales and localizations.

The Locale Object manager 214 scans files 211, 212, and 214 at boot time and uses the data inside these files to build the Locale database 213. The types of files that are scanned for, and where to look for these files is determined by the Locale Object file lookup list('lfll') resource 301 shown in FIG. 3. This resource exists in either a system file, in a Locale Object Manager's preference file, or some other pre designated location.

File types that contain information to be included in the Locale Object Manager's database 213 are required to contain either a Locale Object directory resource ('ldir') and/or a collection of locale object resources ('lobj'). Locale Object directory resources specify what kinds of data a file contains and provides enough information for the Locale Object manager to find the data types.

Locale Object resources describe a data object itself. Data which is intended to be catalogued by the Locale Object Manager is accompanied in embodiments of the present invention by a name table and an attributes table. The Locale Object Manager uses the information in these tables to create keys for finding the data. This allows the specification of name and attributes at system runtime to retrieve services irrespective of locale.

When the Locale object Manager 214 is first initialized it loads the 'lfll' list file 301 and proceeds to lookup file types described in the list sequentially. The first file type described in the list is assigned to Locale Files which have the file type 'lcfl'. The Locale file Lookup list references a Locale directory 320 which may contain a plurality of Locale files 321. After the entry for Locale files other entries can have any order.

The format of the Locale file lookup list resource is a list of FileLookupEntry structures preceded by a long word count.

TABLE 1

| Locale File Lookup List Entry | |
|---|---|
| OSType | FileType |
| OSType | Folder to search |

TABLE 2

| Locale File Lookup List | |
|---|---|
| UInt32 | Count |
| FileLookupEntry | Entries[Count] |

Figure 4:
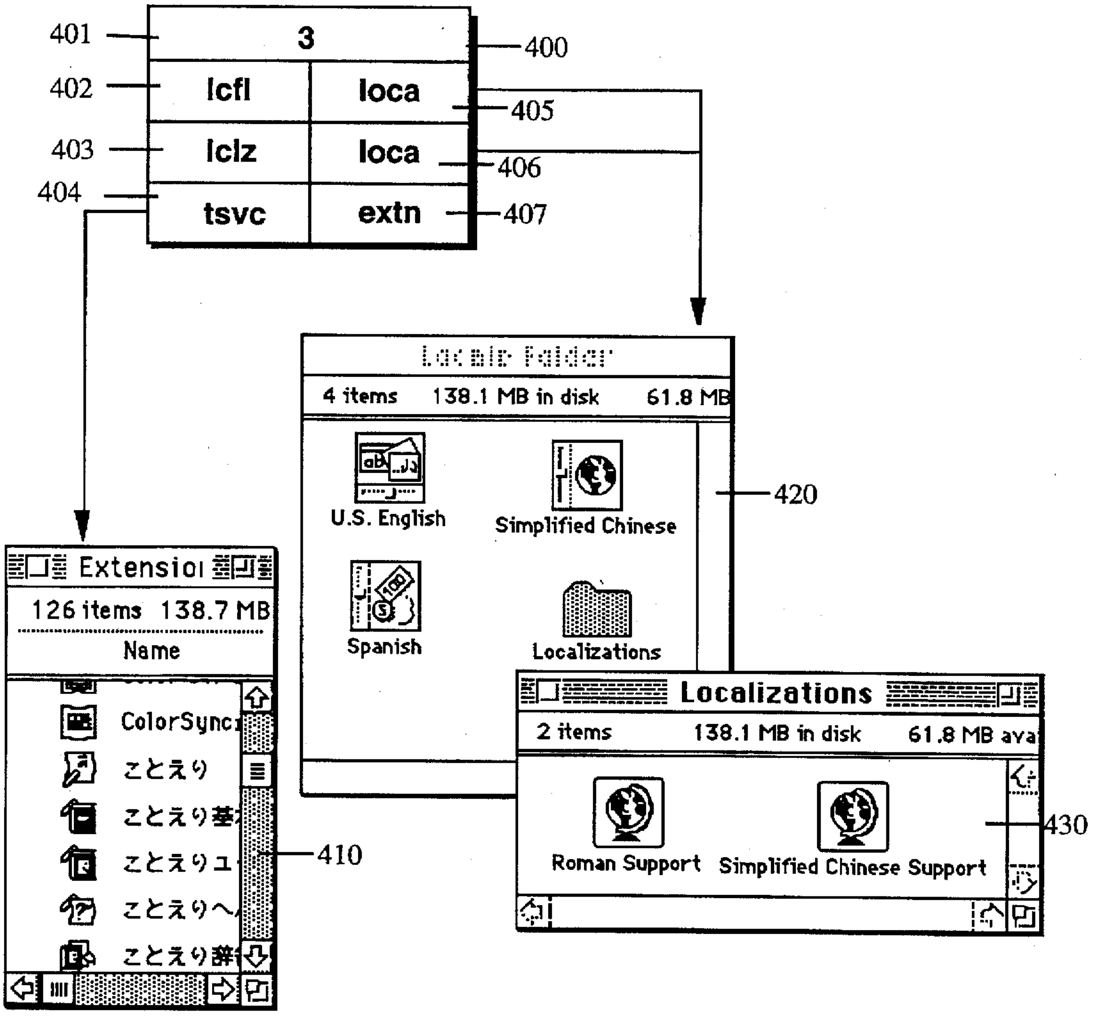
FIG. 4 shows an example of the locale lookup list.

FIG. 4 illustrates how a 'llfl' resource 400 would map to actual files. The 'llfl' in the figure lists 3 file types, as indicated by the count field 401. The first is the type 402 for Locale Files ('lcfl') which are located in the Locale Folder ('loca'). This directory is specified in field 405. The second file type in the 'llfl' file 400 is 'lclz' field 403 which specified the file type for Localization files. These are also located in the Locale directory 420, as referenced by field 406. The Localization files 430 may actually be in a subdirectory, shown as "Localizations", however, the Locale object manager 214 searches all subdirectories in a specified directory. The last item in the 'llfl' is the type and directory location for Text Service files. These may include text input methods like the Japanese Input Method Kotoeri. As shown in the figure, these may be located in a pre designated directory entitled "Extensions" 410.

In the prior art Macintosh brand System versions 7.x, an international configuration resource having the resource type 'itlc' is defined which specifies which script and geographical region the system is localized for. Locale Object Manager 214 uses the system script field in the 'itlc' to set the default current Locale, which is retained in memory in the Locale object manager 214. The 'itlc' is also entered into the Locale database. It can be retrieved by querying the Locale database for Locale objects with the name 'itlc'.

All other resources that the Locale Object manager 214 reads are directory based. Each resource begins with a list of records that provide the offset, length, a checksum that can be used for verification, and an identifying 4-byte tag. Directory entries are described in Table 3. Table 4 illustrates the structure of a directory.

TABLE 3

| Locale Object Directory Entry | | |
|---|---|---|
| OSType | TableTag | Identifies table type |
| UInt32 | checksum | can be used to verify data integrity |
| UInt32 | offset | offset from beginning of the resource to the actual table |
| UInt32 | length | length in bytes of the table. |

TABLE 4

| Directory | | |
|---|---|---|
| UInt32 | count | Number of Locale Object Directory Entries in Table |
| LocaleObjectDirectoryEntry | Entries[count] | Array of LocalObject-DirectoryEntries |

Figure 5:
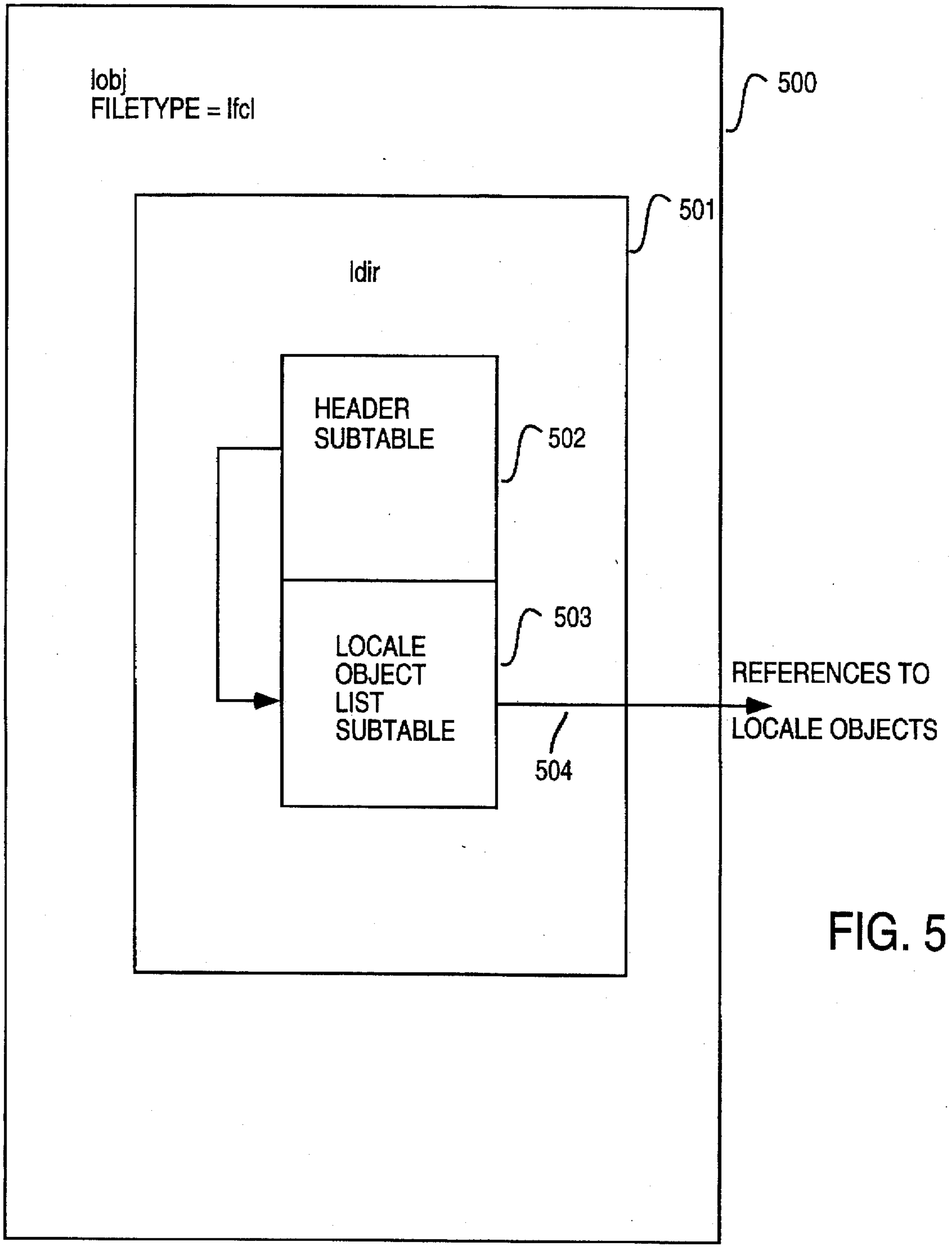
FIG. 5 shows a format of a locale file and the references to locale objects.

Locale Files have the format as shown in FIG. 5. They contain a resource type called a Locale Object directory ('ldir') 501. Directory resources such as 501 contain 2 subtables: the Locale object list subtable 503 and the Locale header subtable 502. Locale directories may optionally contain other subtables. The Locale object list subtable 503 references other Locale objects which defined the Locale objects themselves. A name table (discussed below) is added that includes manufacturer strings, copyright information, and other application visible names, which may be used by the application and/or the Locale object manager 214.

The Locale Header subtable 301 contains three values: A 32-bit word indicating the format, a 32-bit word indicating the Script ID this Locale maps to, and a 32-bit word which contains bit flags characterizing this data. A header subtable is identified by the tag 'head'.

TABLE 5

| Locale Header | | |
|---|---|---|
| UInt32 | format | Version number (e.g. 0x00010000) |
| UInt32 | ScriptID | If ScriptID is not relevant set to −1 |
| UInt32 | flags | big flags |

Different flag values can be contained in the flags field of the header to specify special treatment of the locale object. Two of these include kNeedsFSObjectSpecification, and kLoadObject. kNeedsFSObjectSpecification specifies that the Locale Object Manager should create a FSObjectSpecification and associate it with the entry created in the Locale Object database for a given resource. Clients such as the Language Manager in the Macintosh brand computer system can use this bit to insure that files containing resources can be located without requiring a search through the file system. The kLoadObject flag indicates that the Locale object should be loaded into physical RAM.

The Locale object list subtable 503 lists all the Locale objects associated with a Locale and how and where to find them. The subtable format is described in Tables 6 and 7. A Locale object List subtable 503 is identified by the tag, 'lobl'.

TABLE 6

| Local object List Entry | | |
|---|---|---|
| OSType | dataDescriptor | describes the data reference |
| UInt32 | offsetOrID | If data is a resource this is the resource ID. All resources have a type of 'lobj'. If data exists in a data fork this is an absolute offset to the start of the data. |
| UInt32 | dataLength | length of the data. Can be 0 for a resource reference. |
| OSType | externelFileLocater | If this object is inherited this field contains the resource type of the resource that contains the file locater. There can be three types: alis -- file alias, prfo -- a scarecrow permanent file reference, and 'none' -- used when a the object does not inherit. |
| UInt32 | externelFileResID | Resource ID of the resource containing the file locator. |

TABLE 7

| Locale Directory Subtable | | |
|---|---|---|
| UInt32 | format | format descriptor, should be 0x00010000 |
| UInt32 | count | Number of LocaleObject-Locators to follow. |
| LocaleObjectLocators | objectList[count] | Array of object locators |

The Locale Directory subtable is used to allow inheritance. This allows the specification of a service which actually resides in another locale file, avoiding the need to duplicate the information.

For each Locale Object file that the Locale Object Manager 214 finds, it opens it and locates a locale directory resource. A locale directory resource contains a subtable that describes the locale objects that make up a locale and how to find those objects. For each entry in the locater subtable the Locale Object Manager 214 will attempt to find the described locale object. If the described locale object is successfully located then the Locale Object Manager 214 will create an entry in the Locale database 213. The 'ldir' resource, such as 501, can be viewed as the root of one of the trees, and all the associated Locale objects as leaves.

Figure 6:
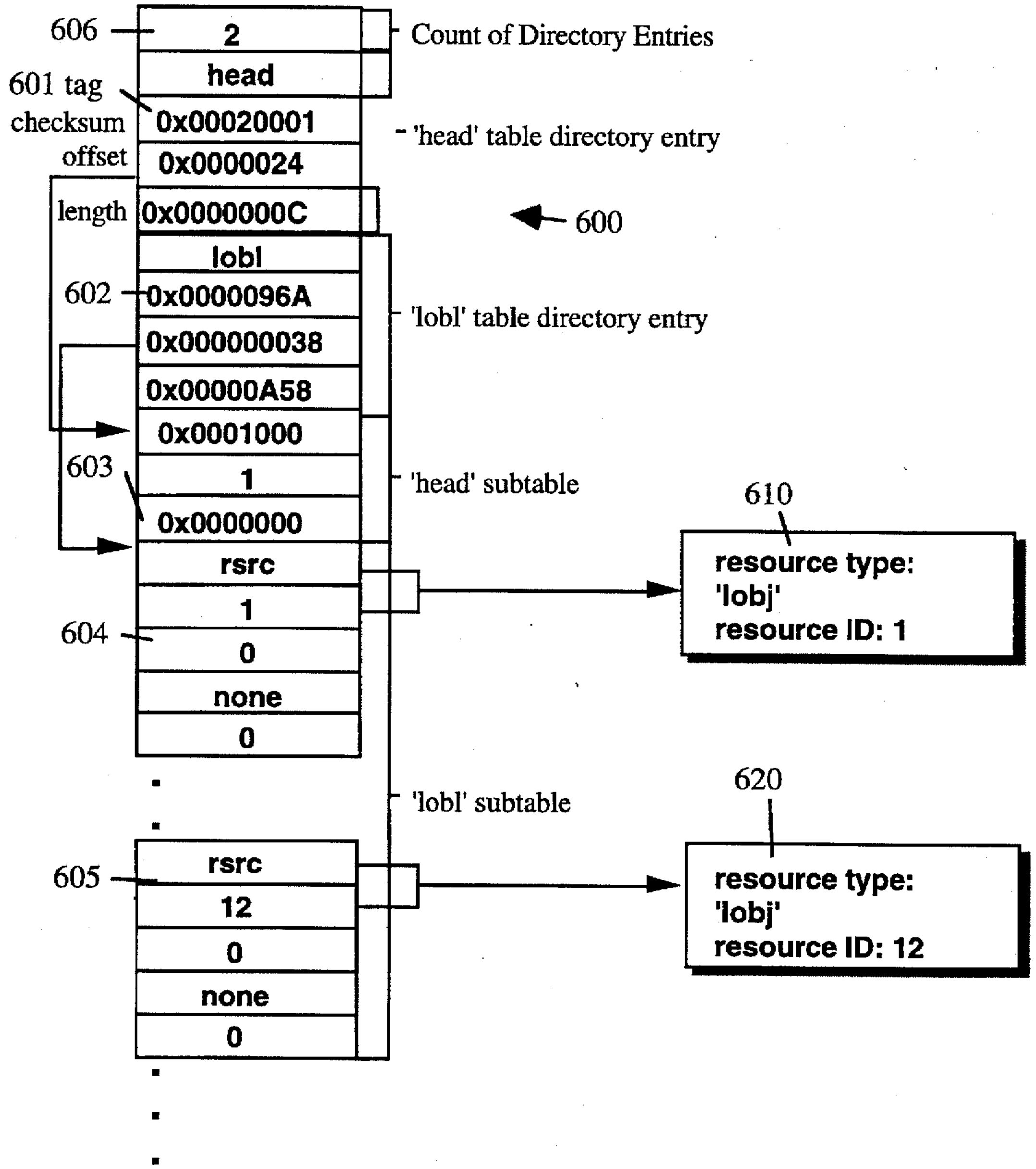
FIG. 6 shows an example locale file and the corresponding references to locale objects.

FIG. 6 illustrates an example Locale Directory resource 600. It contains a count field 606 which specifies that the Locale Directory resource references two Locale objects. It also contains a header field 602 per the format shown in table 3 above. The directory resource 600 further comprises a Locale object directory subtable 602, a header subtable 603, and a Locale object list subtable comprising Locale object list entries 604 and 605. Locale object list entries 604 and 605 have the type 'rsrc' because the referenced Locale objects 610 and 620 are resources. These Locale objects have resource ID's 0 and 12 as shown in the illustration. The actual content of a Locale object, such as Locale objects 610 and 620 which are referenced by these entries in the figure, is illustrated below in FIG. 8. The Locale objects 610 and 620 referenced by the object list entries both exist in the same file as the Locale Directory resource 600. This is indicated by the 'none' constant in the externelFileLocater field of the Locale object list entries 604 and 605.

Locale object Manager 214 creates database entries for each Locale object found in the files it examines at boot time. For Locale files the Locale directory resource, such as 600, is used to locate Locale objects. For other file types in the Locale file lookup list the Locale Manager iterates through the locale objects contained in the files resource fork and creates database entries for each one that is found.

Figure 7:
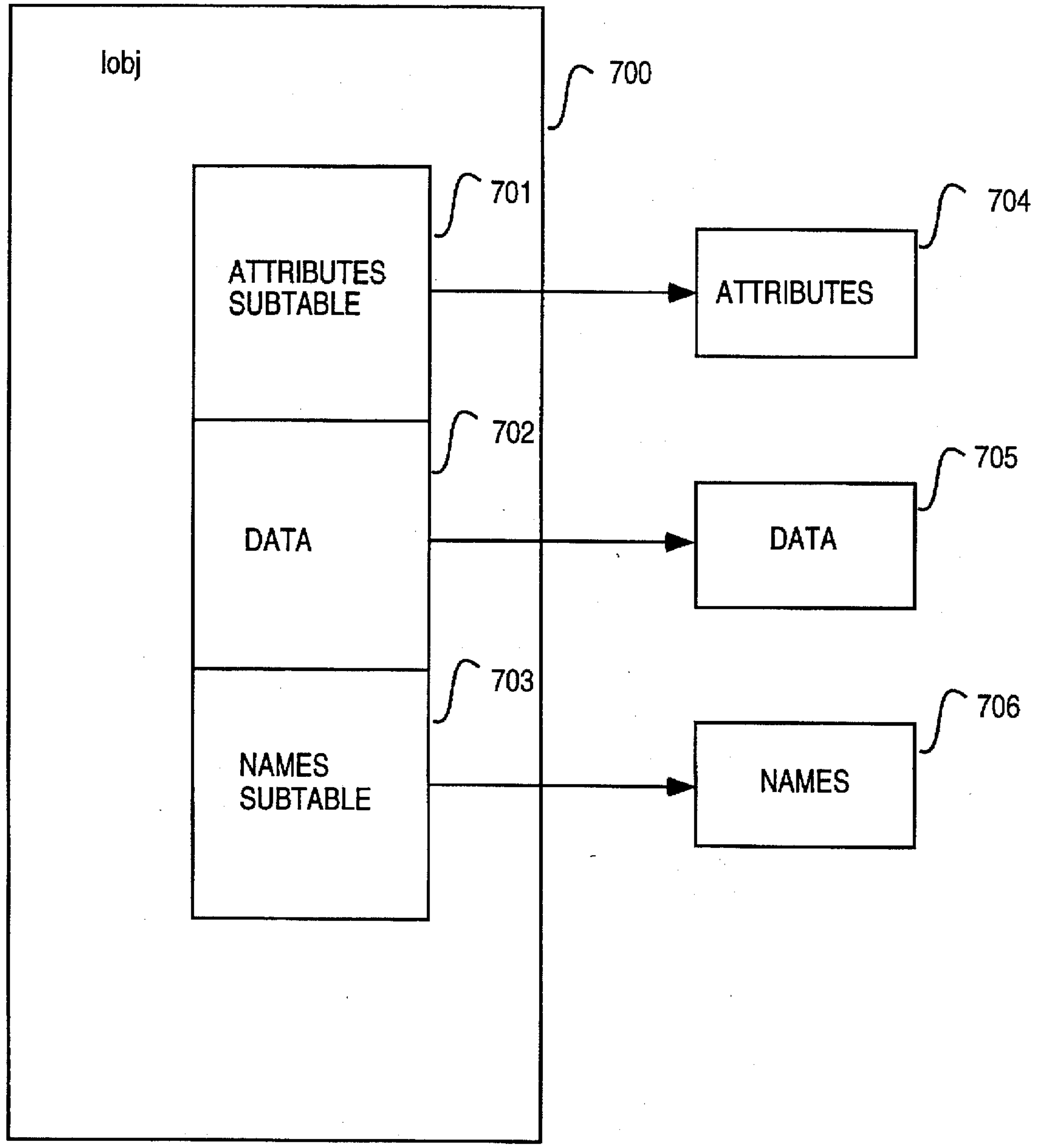
FIG. 7 shows a format of a locale object and the references to attributes and name subtables, and to the data referenced by the locale object.

Locale object resources have the format 700 shown in FIG. 7. It can contain the actual data or information that a client can use to load the data from somewhere else. This type of data is encapsulated in the 'data' subtable 702, which references the data 705. The information contained in the 'data' subtable 702 is unknown to the Locale object manager 214. It retrieves a reference to the object 705 upon an appropriate call from a client. Beyond its offset and length in the 'lobj' resource, such as 604 and 605, the Locale object manager 214 knows nothing about subtables contained within data 702.

Locale objects such as 700 also contain a names subtable ('name') 703. The names subtable 703 is used to associate a collection of text names with an object or file. Names in name table 706 can be used for user visible text or as keys in the locale database. Names in name table 706 can be used, for example, for specifying the function performed by an object (e.g. "SORT"). If a name in the names table 706 is intended to be seen by a user it could specify encoding and language information. If the name string is not intended to be seen by a user than the encoding and language information is set to −1.

Objects in the Locale database 213 are found by the Object Manager by name and attribute(s). The name of an object is taken from names table 706. The attributes associated with an object are taken from the attributes table 704 which is referenced the attributes subtable 701 contained within the object.

An attribute is a named value. The name is a string preceded by a length byte. The value of an attribute is a 16-bit word which indicates the byte length of the value followed by the actual data. An attributes table is a collection of name value pairs preceded by a 32-bit word which contains the number of name-value pairs in the table.

Tables 8–11 describe the data structures that go together to create a locale object resource.

TABLE 8

| Locale Name Record | | |
|---|---|---|
| UInt32 | BaseEncoding | Implementation-dependant code indicating the Base Character Encoding in |
| UInt16 | variantEncoding | Implementation-dependant code indicating the variant Character Encoding |
| UInt16 | charFormat | Implementation-dependant code indicating the variance Character Encoding |
| UInt16 | languageID | Language Code |
| UInt16 | nameID | name identifier |
| UInt8 | nameLength | length of name |
| UInt8 | name[nameLength] | The name. |

In implemented embodiments, some possible names available for the nameID may include: kKeyNameIndex, kUserName, kCopyright, kManufacturer, kFunctionDescription, and kVersion. Other nameID's may also be used, according to implementation. Using NameID's allows an object to contain multiple localized name strings.

TABLE 9

| Names SubTable | | |
|---|---|---|
| UInt32 | format | Format of subtable (0x00010000) |
| UInt32 | count | count of NameLocaleRecords |
| LocalNameRecord | nameRecords[count] | Array of NameLocaleRecords |

TABLE 10

| Attribute Record | | |
|---|---|---|
| UInt8 | nameLength | length of attribute name. |
| UInt8 | name[nameLength] | attribute name |
| UInt16 | valueLength | length of value |
| UInt8 | value[valueLength] | value data |

TABLE 11

| Local object | |
|---|---|
| Directory | Directory of subtables |
| Data | data subtable |
| Names | Names subtable |
| Attributes | Attributes subtable |

Table 11 lists the required subtables that a Locale object contains. Additional subtables can be added by simply adding the subtable and creating a new entry in the Directory table in the Locale object. There is no order requirement except that the directory table must be the first subtable in the resource. Locale objects that should be loaded into memory include a header table that contains a flag field with the kLoadObject flag set.

Figure 8:
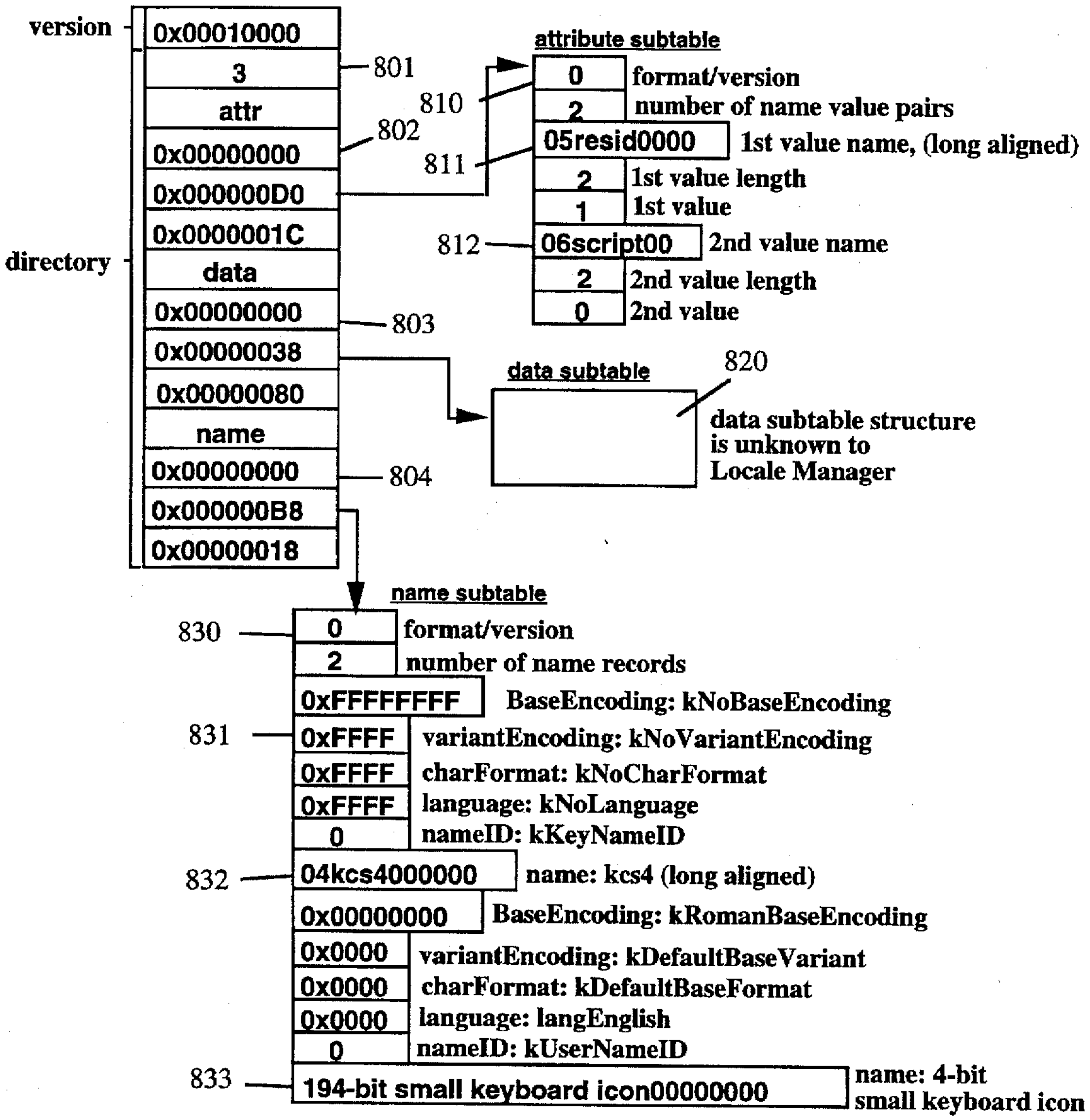
FIG. 8 shows an example of a locale object.

FIG. 8 illustrates an example of a Locale object resource 800 and its subtables. The directory contains three entries 802, 803 and 804, preceded by the directory version and count fields 801 indicating the number of entries in the directory. The Locale object 800 illustrated contains a 'kcs4' resource in it's data table 820, a name subtable 830 containing two Locale name records 831 and 832 (specifying a key name and user name), and an attribute subtable 810 containing two name/value pairs (attributes) 811 and 812. The first attribute or name/value pair 811 specifies that the object is characterized as having an attribute named 'rezid' with a value of 1. The second attribute 812 specifies that this object also has an attribute named 'script' which contains a value of 0.

Figure 9:
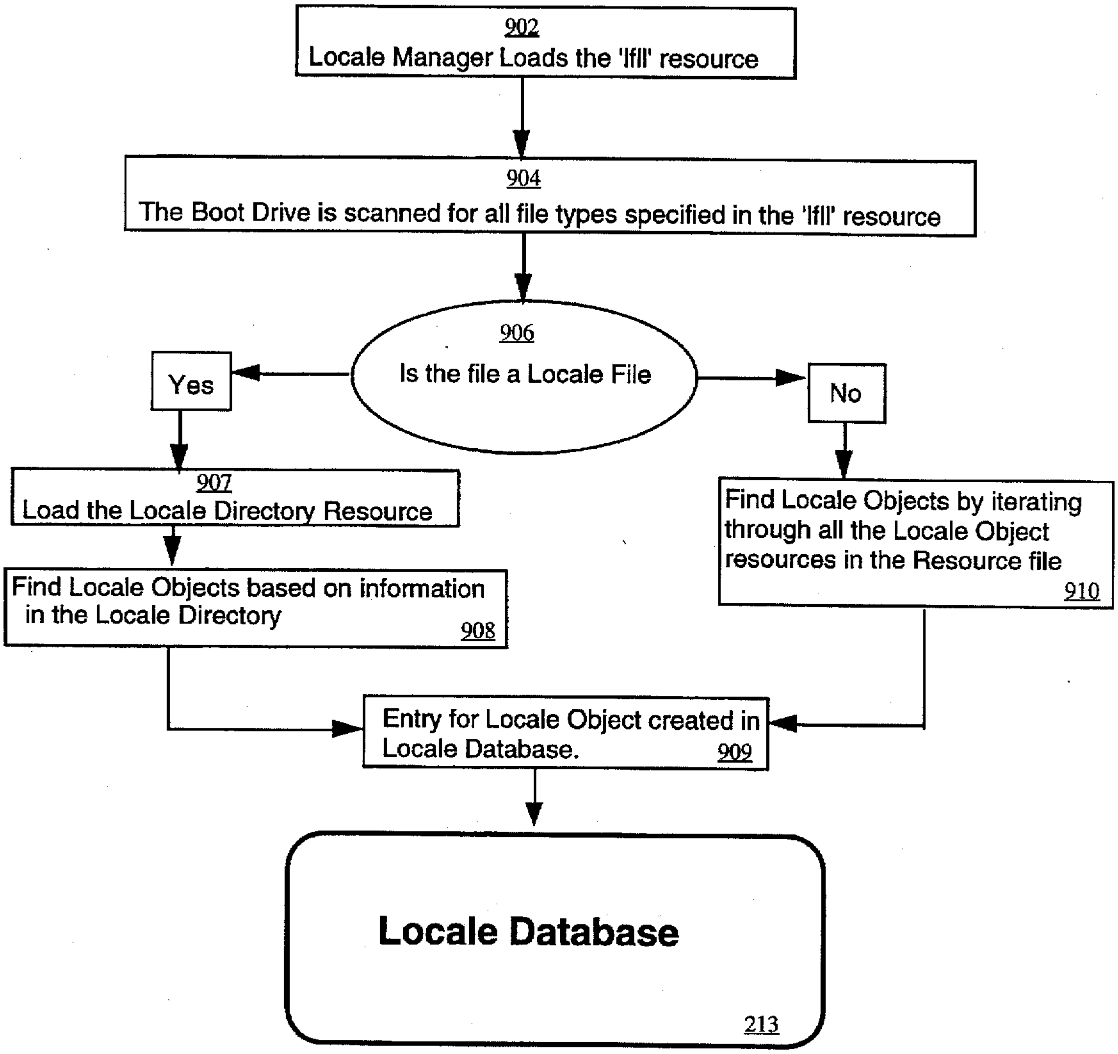
FIG. 9 shows the process performed during initialization of the locale object manager.

The flow of Locale data from locale lookup list files into the Locale database 213 as performed by the Locale Object manager 214 is illustrated in FIG. 9. In these implementations, this process occurs at system boot time, but it may be performed at any implementation-dependent interval.

At system boot time or other implementation-dependant interval, the Locale object manager 214 loads the Locale Lookup list file resource at step 902. The Locale object manager then scans the system's mass storage device 207 or other file system for the presence of all the file types specified in the Locale Lookup list file at step 904. For each file, it is determined whether the file is a Locale file at step 906. If not, then the Locale objects are retrieved by iterating through all the Locale object resources contained in the file at step 910. These are then used to create entries for the Locale objects at step 909 to build the Locale database 213. The Locale database 213 may be either file-mapped, or stored in an implementation-dependant format to speed searching.

In the case of Locale files, as detected at step 906, the associated Locale directory resource is then retrieved at step 907. Using the information contained in the Locale directory resource, the Locale objects are then retrieved at step 908 and stored into the Locale database 213 at step 909.

Application Program Interface (API)

Figure 10:
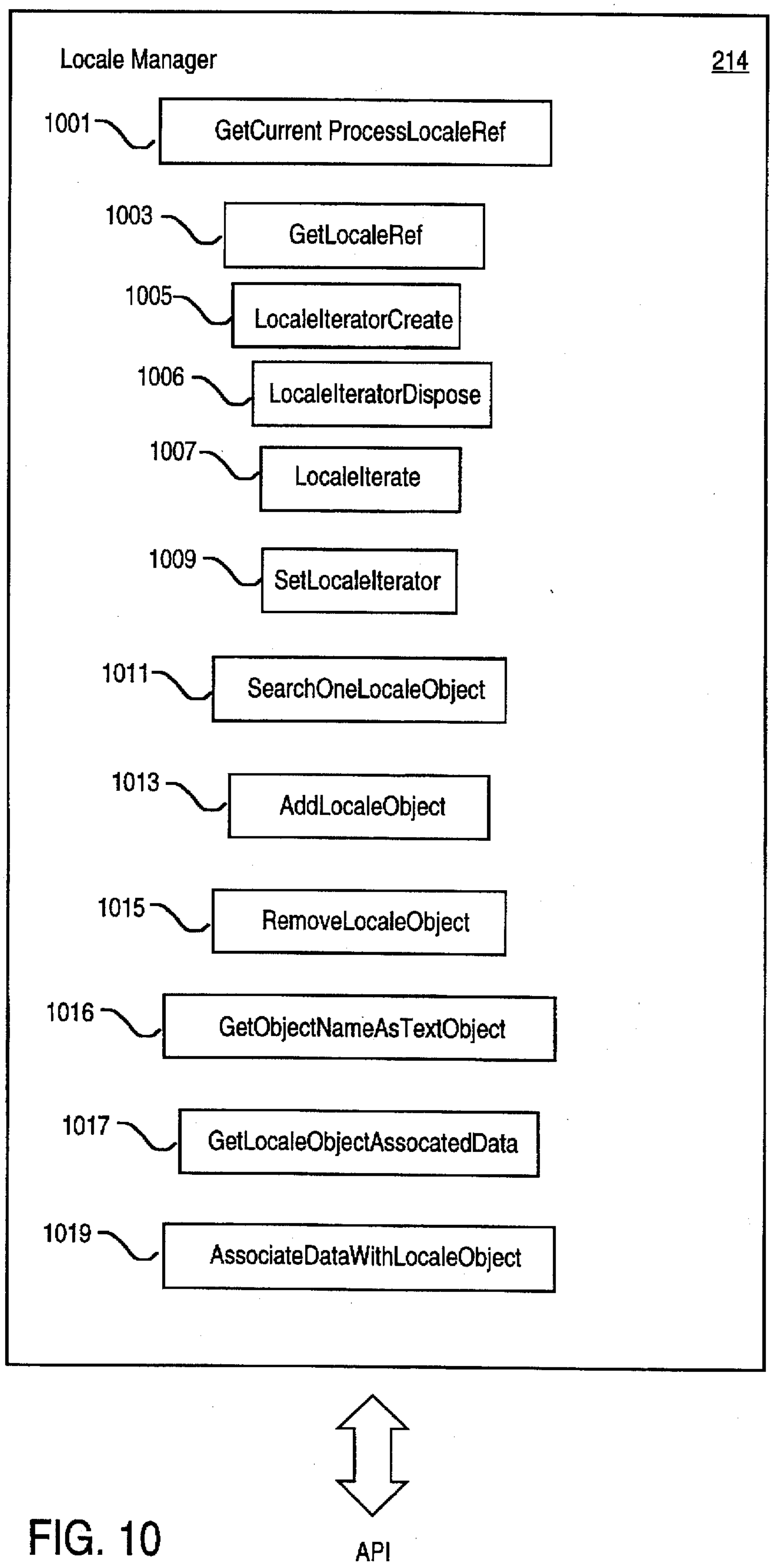
FIG. 10 shows a plurality of processes resident in system memory which provide the application program interface (API) to application programs requiring locales and localization services.
Figure 11:
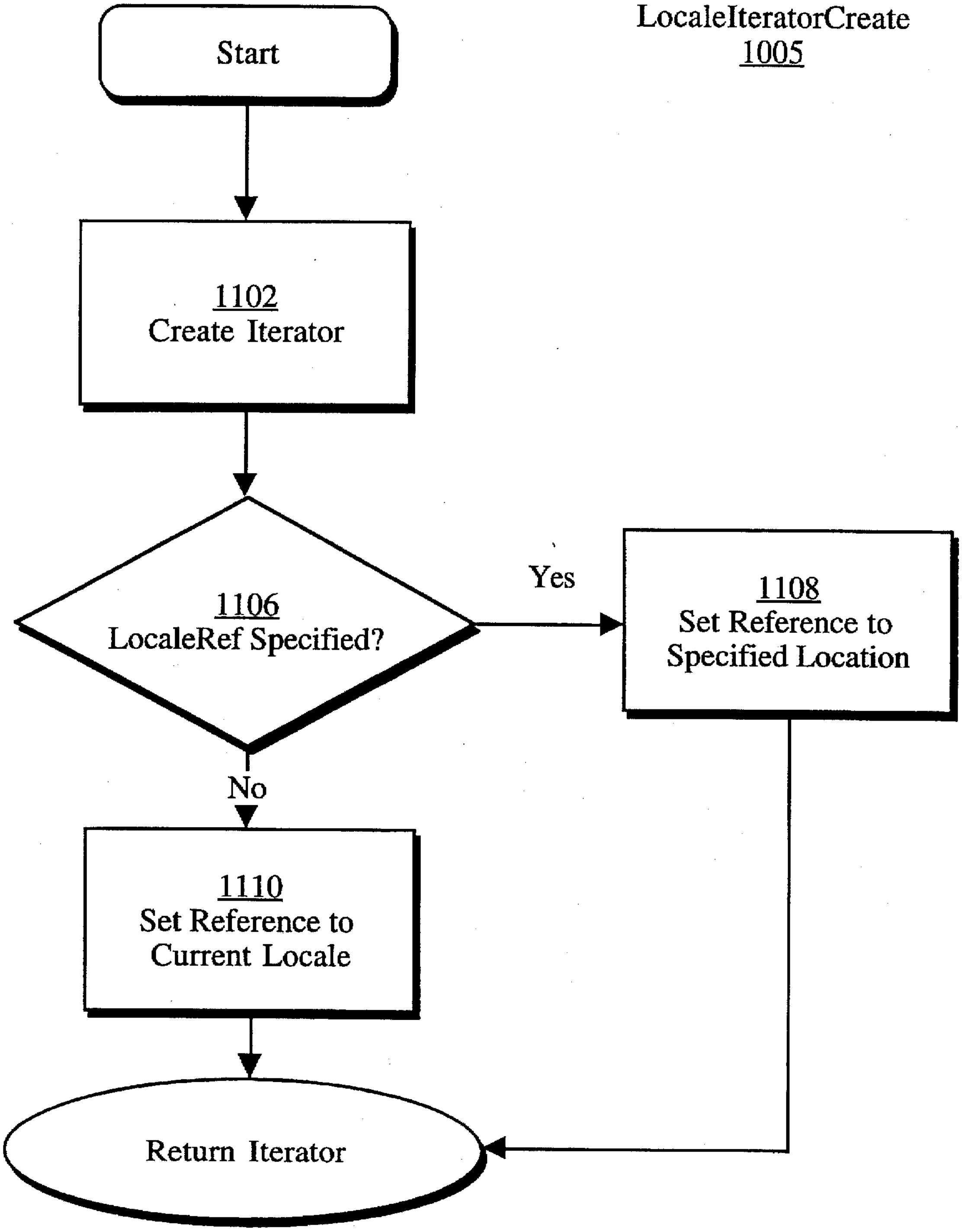
FIG. 11 shows a process for creating an iterator to iterate through the locale database in order to obtain services requested by an application.

Clients request that the Locale object Manager 214 search the database by passing names and a collection of attributes (named values) via its Application Program Interface (API). The supported API calls to procedures resident within the Locale object Manager 214 during computer system runtime are illustrated as 1001–1019 in FIG. 10. Searches can be done with an iterator. An iterator is created by the API call LocaleIteratorCreate 1005. In the call to LocaleIteratorCreate a name and collection of name-value pairs can be passed. Subsequent to the creation of the iterator, LocaleIterate is called to retrieve searches. Optionally, a client can search for a single object with the API call SearchOneLocaleObject 1011. The client has the option of receiving the data immediately as a result of the search, retrieving a reference to the Locale object (LocaleObjectRef) or both. LocaleObjectRefs allow a client to delay the retrieval of the actual data until later, when the object is actually required. A summary of the API calls used in implemented embodiments follows.

GetCurrentProcessLocaleRef 1001—A client calls this function to obtain the default LocaleRef for the current context. A default LocaleRef is retained in the Locale object Manager.

GetLocaleRef 1003—Called to find the Locale that maps to a script code.

SetCurrentProcessLocale 1003—Called by a client to change the Locale of the current context.

LocaleIteratorCreate 1005—Creates an iterator object that can then be used to iterate through the Locale database 213. The caller passes the direction to iterate in, for the Locale database that can only be forward or backward, the name of the type of object to look for, a pointer to 0 or more NameValuePairs, and the number of NameValuePairs.

LocaleIteratorDispose 1006—Disposes of a LocaleIteratorRef.

LocaleIterate 1007—Called to iterate through the Locale data. The search will return a pointer to the objects data in the objectData parameter if a valid object is found. ObjectRef is an opaque reference to the object itself. When there are no more objects left in the database that correspond to the name and attributes specified then the error eObjectNotFound is returned. LocaleIterators can be saved and reused with different names and attributes. However, before beginning a new search a caller should be sure to reset the iterators start point by calling SetLocaleIterator. A pointer to the object's data is returned in the objectData parameter, and the size of that data is returned in a dataSize parameter. A reference to the entire Locale object is returned in an objectRef parameter. If a caller is not interested in any of these three items NULL can be passed. Data and name information from the referenced locale object can be extracted via the functions GetLocaleObjectData and GetLocaleObjectName. These functions are described below.

GetLocaleObjectData 1017—Used to extract data from a LocaleObjectRef which was found via LocaleIterate. The data pointer is a pointer into global read only memory.

GetLocaleObjectName 1016—Retrieves the name(s) of the object contained in the names subtable.

SetLocaleIterator 1009—Change where the iteration will begin. If the locale parameter is NULL the iterator will reset to its original starting point.

SearchOneLocaleObject 1011—This is used for a direct search. The first object matching the name and attributes is returned. No iterator is required. Internally, this routine is equivalent to calling LocaleIterator with a NULL iterator object, and then stopping the search as soon as one object is found.

AddLocaleObject 1013—Adds an object to a given Locale.

RemoveLocaleObject 1015—Removes an object from the Locale database 213. This routine does not dispose the actual data.

GetObjectNameAsTextObject 1016—Uses the nameID and encoding specification to find a name, and returns that name as a TextObject.

GetLocaleObjectAssociatedData 1017—Once an object has been obtained through a database search the caller can query to see if other associated data is attached to that object. When objects have the create FSObjectSpecification flag set in the flags field of the header subtable, the Locale Manager will create an FSObjectSpecification and associate it with the object. Clients that need to subsequently open the file such as the Language Manager or the Text Services manager in the Macintosh brand system use this routine to obtain an FSObjectSpecification. This is done by calling the routine with a tag of 'fsos'. Static data such as the class and function name or the language for which a file is localized is stored in the data subtable.

AssociateDataWithLocaleObject 1019—Associates the data pointed to by a dataPtr with the Locale object.

A LocaleIteratorReference is created to iterate through the data contained in the Locale object Manager's database 213. Multiple iterators, each with different specified attributes (or no attributes at all, if desired, to simply retrieve the next locale object), can be used by the same or different processes for iterating through the database and retrieving different objects. Thus, one iterator may be used for retrieving sorting services, and another may be used for retrieving date formats. As already discussed, the iterator must first be created, and then, the client can cause the iterator to iterate through the database to retrieve the next object having the specified attributes, if any.

NameValuePair structures are filled out by clients prior to an API call. They are the means by which attributes that a client is interested in are passed to the Locale Manager's search engine. Clients ask the Locale Manager to find data using name and attributes. Attributes are named values. Attribute names can be any ASCII string, but there are a number of predefined attribute names in implemented embodiments, as follows: kScriptName, kLanguageName, kRegionName, kResIDName, kEncodingName, and kTextServiceTypeName. Other attribute names may be used, according to implementation, with different associated values to obtain the desired object. Each of these may be passed in an API call to Locale object Manager 214, and the Locale object may be returned responsive thereto.

Figure 12:
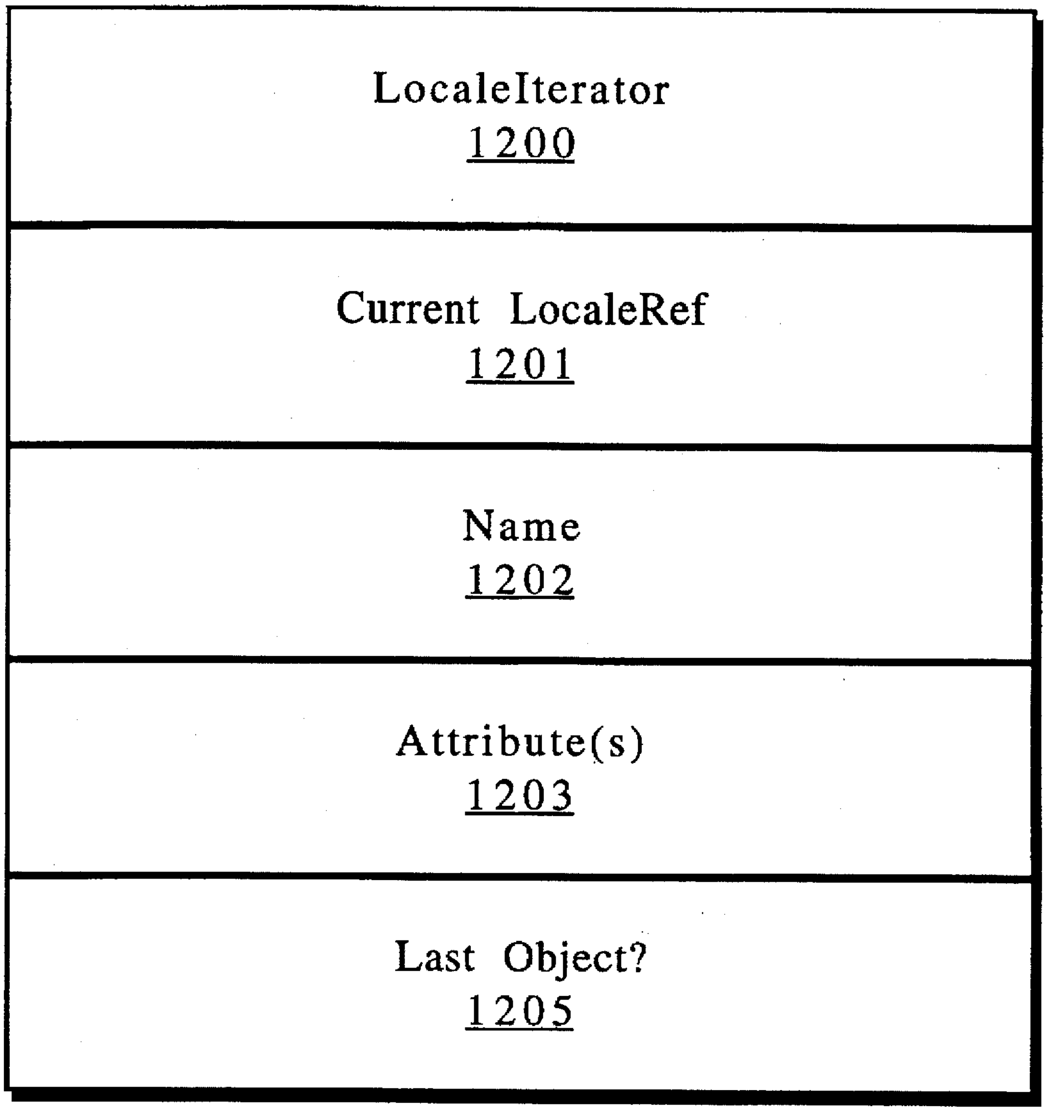
FIG. 12 shows a datum which may be used for storing characteristics of an iterator in the Locale object manager.

A summary of the process used for creating an iterator is shown in FIG. 12. Parameters passed to the process include a LocaleRef, the direction to iterate in, the name of the object to look for (if desired), a pointer to one or name/value pairs (if desired), and a count of a number of name/value pairs passed. If no name or name/value pairs are passed, then the iterator is created at the specified LocaleRef. Calls to LocaleIterate result in every object in the database being returned on each call. If no LocaleRef is specified, then iterator is set to the default or current Locale, depending upon the implementation.

LocaleIteratorCreate process 1005 starts at step 1102 wherein an iterator is created to be used as a reference for subsequent API calls. At step 1106, wherein it is determined whether a LocaleRef has been specified. If so, then the current reference for the iterator is set to the specified locale at step 1108. If not, the reference is set to the current locale which is retained within the Locale object manager 214 at step 1110. The iterator reference is then returned from process 1005.

FIG. 12 illustrates an iterator data structure 1200 which may be used to retain the state of the iterator. The structure includes a current locale reference 1201. The structure also includes the specified name 1202, if any. In addition, the structure can include specified attribute(s) 1203, if any. Finally, a last object flag 1205 is also retained. Thus, upon a subsequent call to LocaleIterate, the function can immediately exit returning a value eObjectNotFound.

Figure 13:
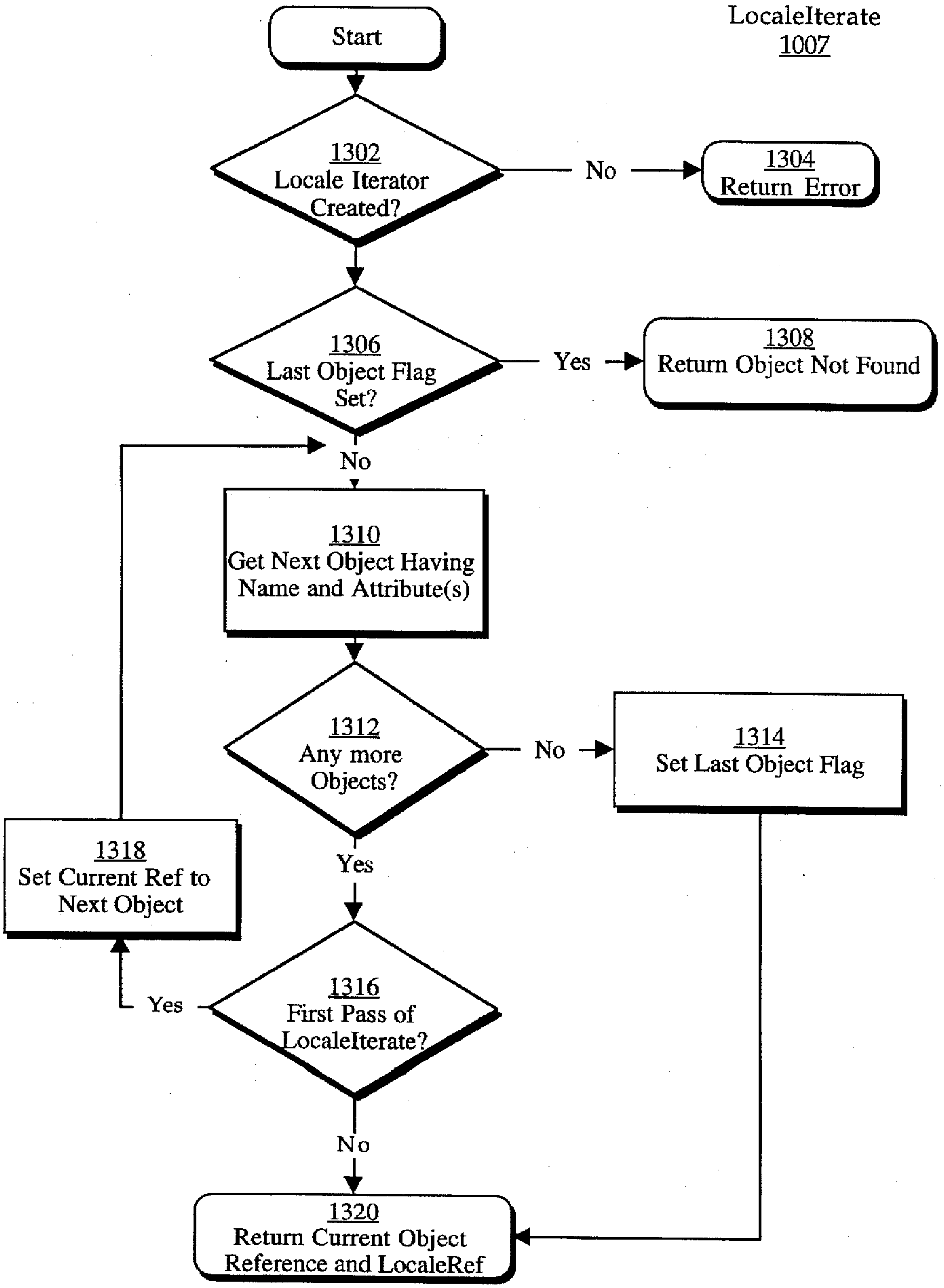
FIG. 13 shows a process for iterating through the locale database to obtain services requested by an application.

FIG. 13 illustrates a detail of the steps taken during iterations to return an object from the Locale database 213. The process starts at step 1302 wherein it is first determined whether the iterator has been created. If not, then the function aborts indicating that the iterator was never created. If, however, the iterator was created, the last object flag is examined at step 1306. If it is set, then the process returns indicating eObjectNotFound. If the last object flag was not set, as detected at step 1306, then the process proceeds to step 1310 wherein the next object having the specified name and attribute(s). This is to prepare the iterator for the next call to LocaleIterate. It is again determined, at step 1312, whether this object was the last object having the name and the attribute(s). If so, then the last object flag is set at step 1314.

If there are more objects in the database having the name and attribute(s), the process determines at step 1316 whether this is the first pass through the process. If so, then the current reference is set equal to the next reference at step 1318, that is, the next object reference retrieved at step 1310. This is so that on subsequent calls to LocaleIterate, that process has already pre-iterated to the current object requested on a call. The process can abort immediately after entry if there are no additional objects (e.g. as detected at step 1306). In the event of a first pass, process 1007 then repeats step 1310. Upon the completion of process 1007, the current object is returned to the client, along with the iterator reference.

Figure 14:
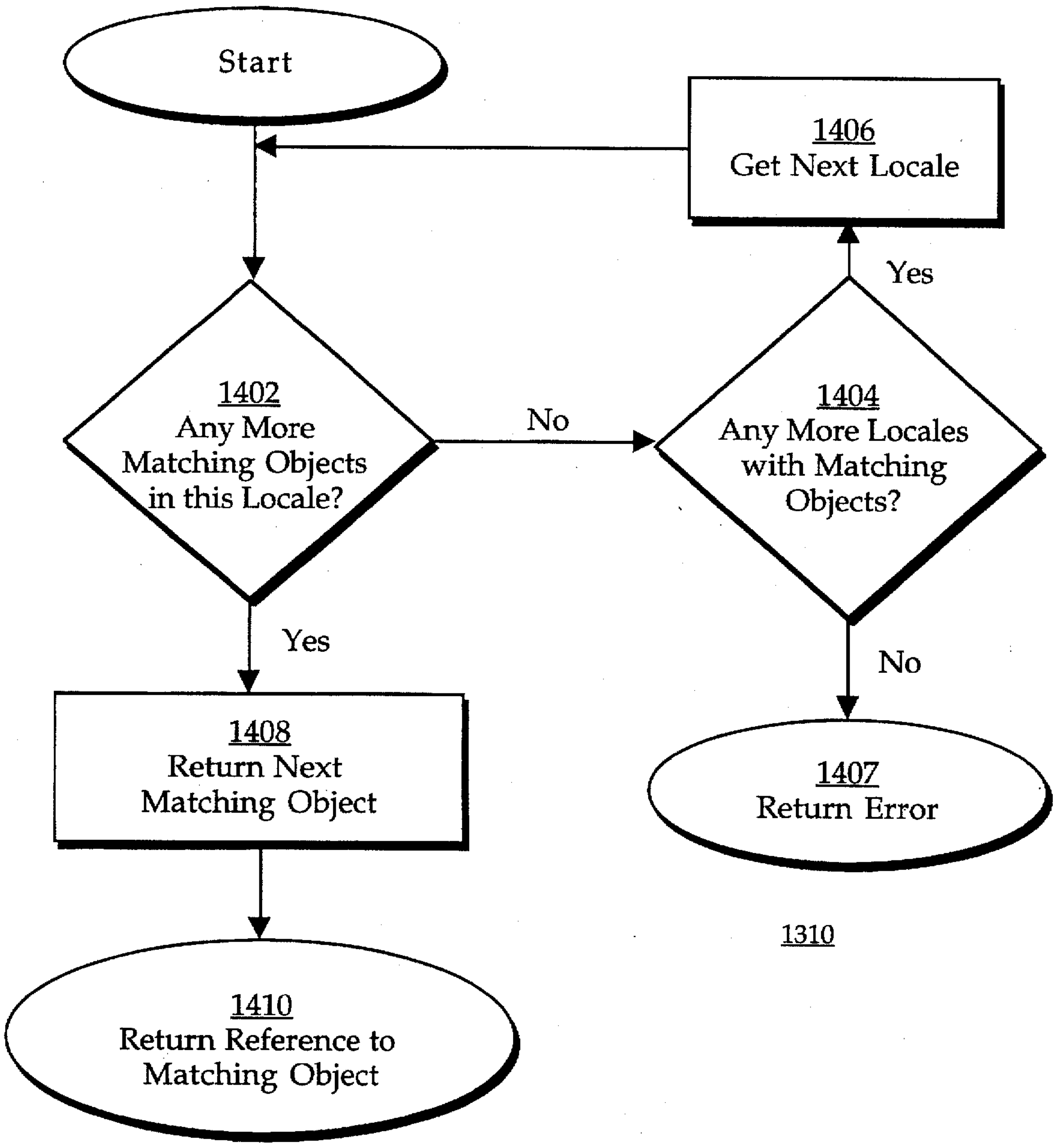
FIG. 14 shows a sub-process for locating the next object in the Locale database which has a matching attribute.

FIG. 14 shows in more detail the steps which may be taken for locating a next matching object within process LocaleIterate 1007. It is first determined if there are any more matching objects in the current locale at step 1402. This step may be performed in a database 213 which arranges objects by Locale. If not, then the process proceeds to step 1404 to determine whether there are any additional defined Locales within the database which have matching objects. If so, then at step 1406, the next Locale is retrieved, and the matching object is retrieved at step 1408. The reference to the matching object can then be returned. If not, then an eObjectNotFound message may be returned to the may process at step 1407.

As shown by FIG. 14, Locale boundaries can be crossed when iterating through the database with LocaleIterate. Specifying a LocaleRef when calling LocaleIteratorCreate describes where a search begins. However, when searching with an iterator all objects in the database are examined. In short, a Locale object belonging to a different Locale then the one which was passed to LocaleIteratorCreate can be returned as the result of LocaleIterate.

Figure 15:
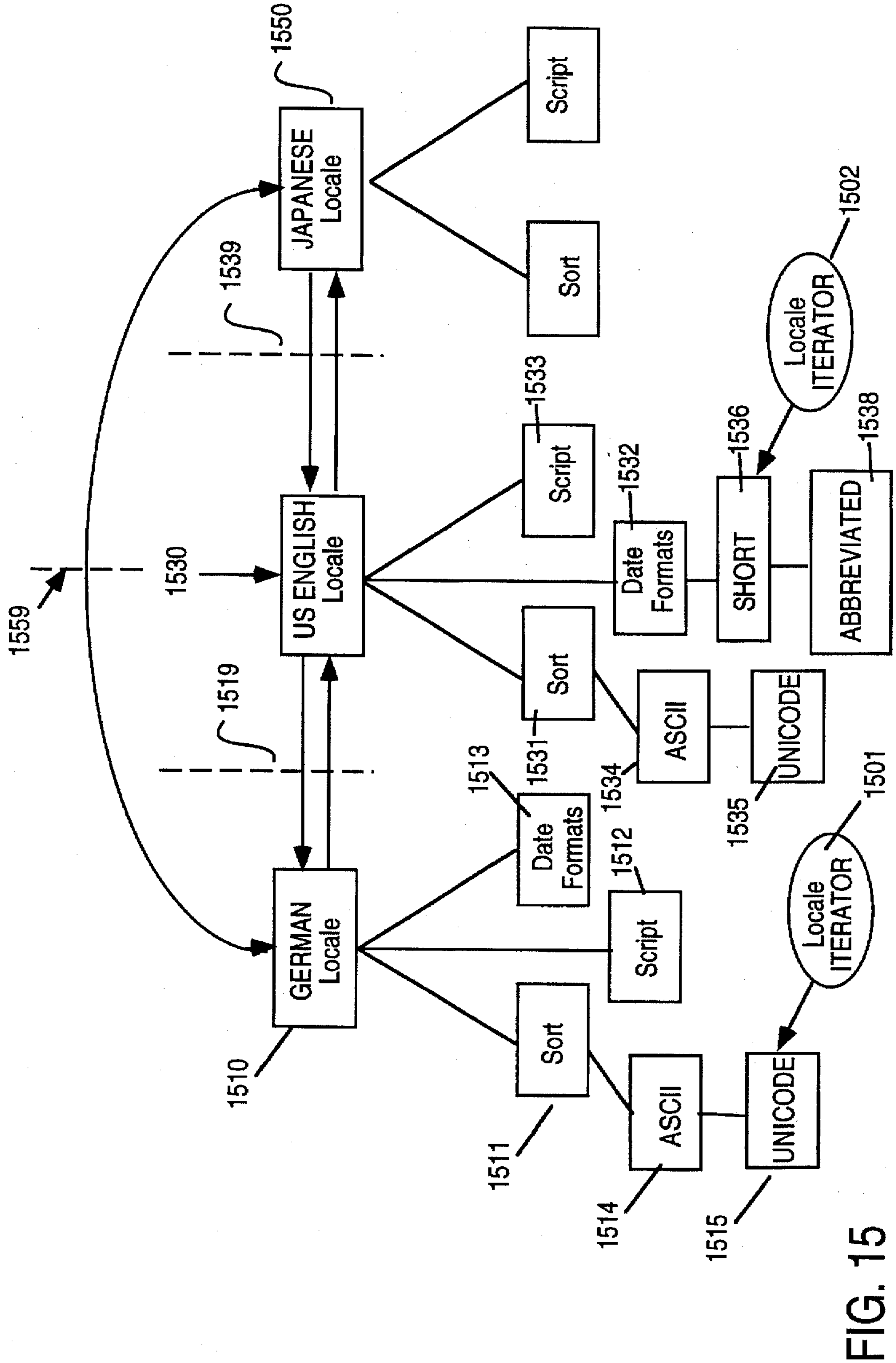
FIG. 15 shows the locale database resident in the locale object manager's system memory, a plurality of iterators in the database, and the results of iterating through the locale database.

This is further illustrated with reference to FIG. 15. For example, if a Locale Database 213 has the structure shown in FIG. 15, wherein defined Locales such as 1510, 1530, and 1550 hierarchically reference all names which are valid within the Locale. For example, a structure defining a Locale 1510 references the application visible names "Sort" 1511, "Script" 1512, and "Date Formats" 1513. Referenced by a name, such as "Sort" 1511, could be objects 1514, and 1515, which each have unique name/value pairs specifying that the encoding for the sort objects is ASCII and Unicode, respectively. If an iterator is currently referencing the Unicode Sort object 1515, then an iteration may cause the iterator to then reference the next object, ASCII object 1511. Another iteration may cause the iterator to then cross the locale boundary 1519 between the German Locale 1510 and the US English Locale 1530 to reference one of the sorting objects 1534 or 1535. In the case that the attribute specifies an ASCII encoding sort object, the first iteration out of the German locale object 1514 will immediately cause LocaleIterate process 1007 to return a reference to object 1534, crossing the locale boundary 1519. Any of the locale boundaries 1519, 1539, and 1559 can be crossed by calls to LocaleIterate, even by the same application program.

As previously described, a single application can have multiple iterators for retrieving multiple services/objects. As shown in FIG. 15, which may be the application-visible context of the database for a single application program, an iterator such as the second LocaleIterator 1502 which may be used for retrieving date formatting objects. Note that the iterator is not restrained, like iterator 1501, from traversing across locale boundaries. Thus, a single application may reference multiple iterators each which reside in different locales, or are typically associated with different Locales.

Thus, by use of the foregoing, improved capabilities from different services, irrespective of locale, can be provided to application programs. Objects or services provided by such objects may be retrieved based upon relevant attributes, irrespective of which Locale or locale, as in the prior art, the objects have been defined for. It will be appreciated that though the foregoing has been described especially with reference to FIGS. 1–16, that many modifications made be made, by one skilled in the art, without departing from the scope of the invention as described here. The invention is thus to be viewed as limited only by the appended claims which follow.

What is claimed is:

1. An automatic method for providing international services on a computer system comprising the following steps:

a. establishing a set of services, said set of services specifying different functions required for said international services;

b. storing said services into a database in said computer system arranged by different locales;

c. detecting a request from a first process requesting a first international function;

d. responsive to said request, scanning in said database for a first service which provides said first international function, and if said first service does not exist in a first locale in said database, then scanning in a second locale in said database; and e. if said second locale contains said first service then retrieving said first service and making said first service available to said first process.

2. The method of claim 1 further comprising the step of repeating steps d and e if said second locale does not contain said first service said second locale becoming said first locale, and a third locale becoming said second locale, and repeating until a locale contains said first service.

3. The method of claim 1 wherein said request from said first process for said first international function includes a first attribute, and said step of scanning includes determining if said second locale contains a service having said first attribute.

4. The method of claim 3 wherein said first attribute includes a first name and a first associated value and said step of scanning includes determining if said second locale contains a service having said first name and an associated value equal to said first associated value.

5. The method of claim 1 wherein said request from said first process for said first international function includes a first name, and said step of scanning includes determining if said second locale contains a service having said first name.

6. The method of claim 1 wherein said request from said first process for said first international function includes a first attribute and a first name, and said step of scanning includes determining if said second locale contains a service having said first name and said first attribute.

7. The method of claim 6 wherein said first attribute includes a first name and a first associated value and said step of scanning includes determining if said second locale contains a service having said first name and an associated value equal to said first associated value.

8. The method of claim 1 wherein scanning includes iterating through each of said set of services in said database by each of said different locales.

9. The method of claim 8 wherein said iterating includes said first process invoking an iteration function, and said iteration function is invoked for each separate iteration in said database.

10. A method for providing localized services on a computer system comprising the following steps:

a. responsive to a request from a first process requesting a first international function, scanning in a database for a first service which provides said first international function, wherein said database is arranged by locale, and if said first service does exist in a first locale in said database, then scanning in a second locale in said database; and b. determining if said second locale contains said first service then retrieving said first service and making said first service available to said first process.

11. The method of claim 10 wherein said first process references at least two references to at least two services which reside in at least two of said locales.

12. A method for providing localized services on a computer system by a first process referencing at least two functions, said at least two functions residing in separate locales in a database containing services arranged by locale, each of said services stored into said separate locales by attribute.

13. The method of claim 12 wherein said functions include text service functions.

14. The method of claim 12 wherein said functions include sorting service functions.

15. The method of claim 12 wherein said functions include formatting service functions.

16. The method of claim 15 wherein said first process references at least two references to at least two services which are in at least two of said locales.

17. An apparatus comprising a processor coupled to a memory, said memory configured to include a set of services, said set of services stored into a database arranged by different locales said memory further configuring to scan in said database for a first service which provides a first function, and if said first service does not exist in a first locale in said database, then retrieving said first service from a second locale and making said first service available to said first process.

18. The apparatus of claim 17 wherein said database further includes an attribute stored with each of said set of service(s), and said configuration includes a process for said determining which includes determining if said second locale contains a service having a first attribute.

19. The apparatus of claim 18 wherein said first attribute includes a first name and a first associated value.

20. An apparatus for providing localized services on a computer system comprising a. a first means for storing a database arranged by locale;

b. a second means receiving a request for a first international service;

c. a third means for scanning through said database across locale boundaries to retrieved said first international service; and d. a fourth means for providing said first international service.

21. An apparatus for providing localized services on a computer system which comprises a means for a first process referencing at least two functions, said at least two functions residing in separate locales in a database containing services arranged by locale, each of said services stored into said separate locales by attribute.

22. The apparatus of claim 21 wherein said functions include text service functions.

23. The apparatus of claim 21 wherein said functions include sorting service functions.

24. The apparatus of claim 21 wherein said functions include formatting service functions.

25. The apparatus of claim 24 wherein said first process references at least two references to at least two services which are in at least two of said locales.

* * * * *